United States Patent
Konstantinova et al.

(10) Patent No.: US 11,257,100 B2
(45) Date of Patent: Feb. 22, 2022

(54) PRODUCT OPTIMIZATION CRAWLER AND MONITOR

(71) Applicant: SAP SE, Walldorf (DE)

(72) Inventors: Iuliia Konstantinova, Rauenberg (DE); Ralph Debusmann, Ludwigsburg (DE); Michail Vasiltschenko, Schriesheim (DE); Anton Snitko, Griesheim (DE); Günther Fischer, Nußloch (DE)

(73) Assignee: SAP SE, Walldorf (DE)

(*) Notice: Subject to any disclaimer, the term of this patent is extended or adjusted under 35 U.S.C. 154(b) by 160 days.

(21) Appl. No.: 16/223,340

(22) Filed: Dec. 18, 2018

(65) Prior Publication Data

US 2020/0193456 A1     Jun. 18, 2020

(51) Int. Cl.
*G06Q 30/02* (2012.01)
*G06N 20/00* (2019.01)
*G06F 16/951* (2019.01)
*G06N 5/04* (2006.01)

(52) U.S. Cl.
CPC ....... *G06Q 30/0201* (2013.01); *G06F 16/951* (2019.01); *G06N 5/04* (2013.01); *G06N 20/00* (2019.01); *G06Q 30/0282* (2013.01)

(58) Field of Classification Search
None
See application file for complete search history.

(56) References Cited

U.S. PATENT DOCUMENTS

| | | | | |
|---|---|---|---|---|
| 7,505,921 | B1* | 3/2009 | Lukas | G06Q 30/0603 705/26.5 |
| 8,478,624 | B1* | 7/2013 | Bivens | G06Q 10/06395 705/7.12 |
| 10,423,999 | B1* | 9/2019 | Doctor | G06Q 30/0625 |
| 10,733,654 | B2* | 8/2020 | Jadhav | G06F 16/95 |
| 2003/0216955 | A1* | 11/2003 | Miller | G06Q 10/06375 705/7.29 |
| 2004/0111383 | A1* | 6/2004 | McConnell | G06Q 10/04 705/400 |
| 2004/0230506 | A1* | 11/2004 | Casco-Arias | G06Q 10/06395 705/35 |

(Continued)

*Primary Examiner* — Sujay Koneru
(74) *Attorney, Agent, or Firm* — Sterne, Kessler, Goldstein & Fox P.L.L.C.

(57) ABSTRACT

Disclosed herein are system, method, and computer program product embodiments for crawling feedback sources and generating a product improvement recommendation. In an embodiment, a Product Optimization Crawler and Monitor (POCM) system may crawl feedback comments from different sources such as an Internet source or a customer feedback database. The POCM system may apply artificial intelligence, natural language processing, and constraint modeling techniques to the feedback comments to identify product features as well as a feedback category corresponding to the product feature. The feedback category may include a positive, negative, or neutral feedback category. Using this information, the POCM system may generate a summary of the feedback from different sources and/or generate product improvement recommendation. The product improvement recommendation may include suggesting that a component from a first product be replaced with a similar component from a second product.

21 Claims, 6 Drawing Sheets

(56) References Cited

U.S. PATENT DOCUMENTS

| | | | |
|---|---|---|---|
| 2006/0089920 A1* | 4/2006 | Ramesh | G06Q 30/0283 705/400 |
| 2007/0156516 A1* | 7/2007 | Moissinac | G06Q 30/0275 705/14.46 |
| 2011/0087517 A1* | 4/2011 | Abbott | G06F 30/17 705/7.28 |
| 2011/0264598 A1* | 10/2011 | Fuxman | G06Q 30/0281 705/343 |
| 2013/0218865 A1* | 8/2013 | Angulo | G06F 16/248 707/709 |
| 2014/0279233 A1* | 9/2014 | Lau | G06Q 30/0603 705/26.41 |
| 2015/0046281 A1* | 2/2015 | Shivaswamy | G06Q 30/0631 705/26.7 |
| 2015/0106507 A1* | 4/2015 | Kaneko | H04L 41/5035 709/224 |
| 2015/0161257 A1* | 6/2015 | Shivaswamy | G06F 16/951 707/709 |
| 2015/0206224 A1* | 7/2015 | Ouimet | G06Q 30/0631 705/14.49 |
| 2015/0310526 A1* | 10/2015 | Warren | G06F 16/951 705/26.62 |
| 2016/0072891 A1* | 3/2016 | Joshi | G06Q 30/0631 370/254 |
| 2016/0078507 A1* | 3/2016 | Shivaswamy | G06Q 30/0605 705/26.2 |
| 2016/0117737 A1* | 4/2016 | Sinha | G06Q 30/0245 705/14.44 |
| 2016/0342914 A1* | 11/2016 | Nawal | G06Q 10/06313 |
| 2016/0343004 A1* | 11/2016 | Brink | G06Q 30/0201 |
| 2017/0091780 A1* | 3/2017 | Kannan | G06F 16/3331 |
| 2017/0140405 A1* | 5/2017 | Gottemukkala | G06Q 30/0206 |
| 2017/0324705 A1* | 11/2017 | Kamdar | H04L 61/1511 |
| 2017/0372408 A1* | 12/2017 | Khandelwal | G06Q 30/0641 |
| 2018/0060893 A1* | 3/2018 | Omer | G06F 17/153 |
| 2018/0189857 A1* | 7/2018 | Wu | G06F 40/30 |
| 2018/0260885 A1* | 9/2018 | Binafard | G06Q 30/0641 |
| 2018/0349795 A1* | 12/2018 | Boyle | G06Q 10/067 |
| 2019/0095799 A1* | 3/2019 | Lidar | G06N 7/005 |
| 2019/0172075 A1* | 6/2019 | Kenkre | G06Q 50/01 |
| 2019/0238952 A1* | 8/2019 | Boskovich | G06K 9/00671 |
| 2020/0089761 A1* | 3/2020 | Guerra | G06N 20/10 |
| 2020/0193229 A1* | 6/2020 | Natarajan | G06K 9/6257 |

* cited by examiner

PRODUCT OPTIMIZATION CRAWLER AND MONITOR

BACKGROUND

As companies continue to develop new products, companies seek new ideas to generate improvements. These improvements may include improvements to physical items or may include improvements to software or graphical user interfaces. To develop these improvements, companies may employ research and development teams. These teams, however, may not be able to identify improvements based on gathered data, including gathered data from competing products. For example, the teams may not be able to efficiently manage customer reviews or information obtained through support channels. In this manner, companies seeking to improve products may not be able to identify relevant improvement feedback due to the inefficient management of feedback data.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
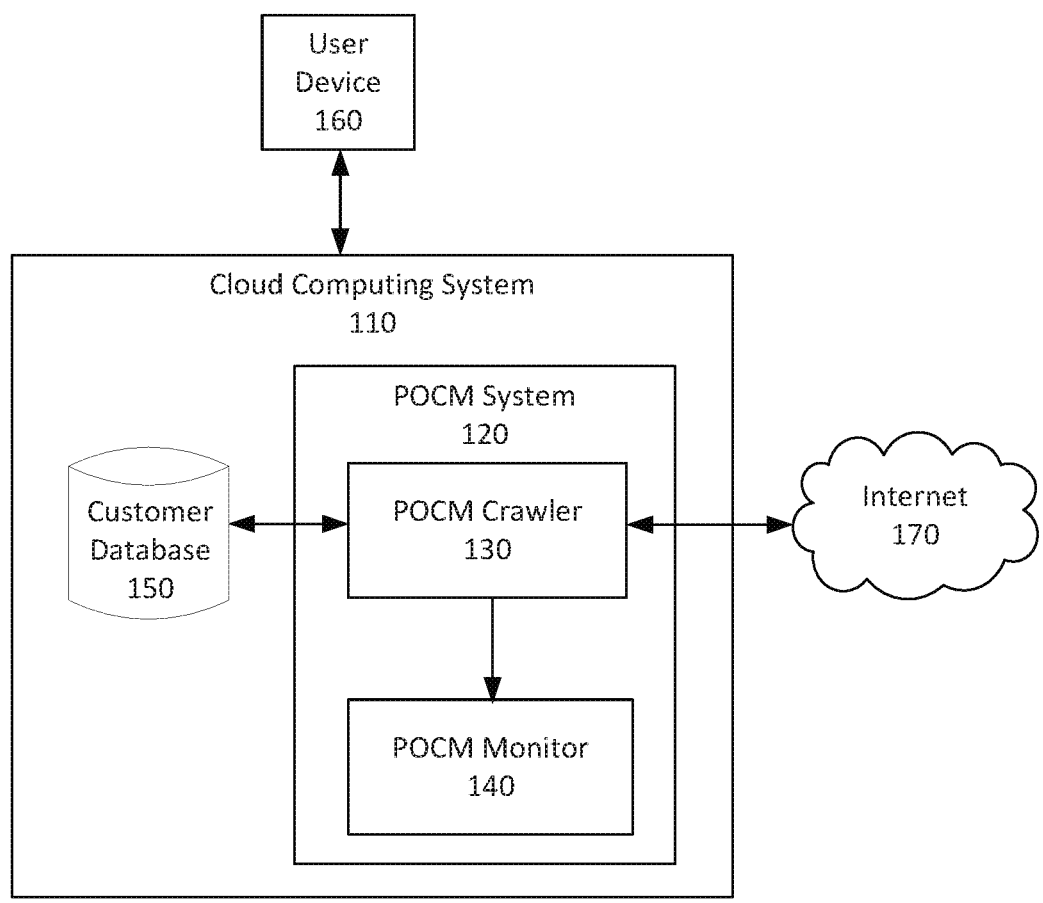
FIG. 1 depicts a block diagram of a cloud computing environment, according to some embodiments.

Provided herein are system, apparatus, device, method and/or computer program product embodiments, and/or combinations and sub-combinations thereof, for generating a product optimization recommendation. As used herein, the term "optimization" (and the like) may include improvement or enhancement, as well as optimization.

In an embodiment, a Product Optimization Crawler and Monitor (POCM) system may identify feedback information from different sources to generate a recommendation indicating an improvement for a product. The POCM system may include a POCM crawler and/or a POCM monitor. The POCM crawler may crawl different sources of information to identify information related to a product. For example, the POCM crawler may identify feedback comments posted on product feedback websites and/or social media websites. POCM crawler may also access feedback from a support channel or a customer database. This feedback may be private comments received by a company, such as, for example, help tickets or requests for customer support. The feedback may identify product features that do not function properly or cause grief among customers.

The POCM crawler may identify feedback comments directed specifically to a company's product and/or may identify feedback corresponding to related products. The related products may be similar products and/or competing products. Parameters set by a system administrator using the POCM crawler may allow for customization of the information retrieved. This customization may identify keywords during a search, particular Internet sources or websites, particular languages, metadata related to a post, such as a time period or location, and/or other information filtering the information obtained by the POCM crawler. The customization may also extend to allow the selection of different products. In an embodiment, the POCM crawler may automatically identify related products using machine learning techniques to identify similarities. Based on the similarities, the POCM crawler may gather and/or aggregate the related information.

After the POCM crawler has gathered the information, a POCM monitor may apply an improvement or optimization engine to the aggregated information to generate a product improvement recommendation. Using machine learning techniques, the POCM monitor may identify textual information gathered by the POCM crawler and categorize the textual information into feedback categories. For example, the feedback categories may indicate whether the textual information represents a positive, negative, or neutral comments. The POCM monitor may also identify particular features of a product related to the feedback category and/or associate the feature with the feedback category. If a comment states that a particular element of a product functions poorly, the POCM monitor may correlate the product element with a negative feedback category. For example, if a comment states that the gears of a bicycle constantly jam, the POCM monitor may categorize the comment as a negative comment against the gears of the bicycle. Similarly to negative comments, if a comment states that a particular element of a product functions well, the POCM monitor may correlate the product element with a positive feedback category.

Using the POCM crawler and the POCM monitor, a POCM system may identify feedback from different information sources and correlate the feedback to identify product improvements. The POCM system may correlate information from multiple sources, including public sources (such as, for example, Internet sources) as well as private sources (such as, for example, a private company database). Similarly, the POCM system may also correlate product features across different products. The products may share common features identified by the POCM system. Using this information, the POCM system may generate a new product recommendation and/or a product improvement recommendation.

The POCM system may organize feedback data to efficiently manage customer feedback. Through the crawling of multiple sources of information, the POCM system may automatically organize and/or categorize feedback. Using this information, the POCM system may apply machine learning techniques to recognize product feedback patterns and/or synthesize product improvement recommendations. The POCM techniques may be applied in a cloud computing platform as a plug-in so that companies may organize and/or process received feedback data along with feedback information crawled from an Internet source.

Various embodiments of these features will now be discussed with respect to the corresponding figures.

FIG. 1 depicts a block diagram of a cloud computing environment 100, according to some embodiments. Cloud computing environment 100 may include a cloud computing system 110, a user device 160, and/or the Internet 170. Cloud computing system 110 may include a Product Optimization Crawler and Monitor (POCM) system 120. POCM system 120 may include a POCM crawler 130 and/or a POCM monitor 140. Cloud computing system 110 may also include a customer database 150.

Cloud computing system 110 may include one or more processors, memory, databases, in-memory databases, servers, routers, modems, and/or antennae configured to interface with user device 160 and/or Internet 170. User device 160 may communicate with cloud computing system 110 via a local area network (LAN), a wireless network, and/or via Internet 170. For example, user device 160 may execute an Internet browser, an application, and/or other API to access and/or communicate with cloud computing system 110. Cloud computing system 110 may provide a cloud computing platform to user device 160.

Cloud computing system 110 may host POCM system 120. POCM system 120 may a plug-in and/or may be integrated within cloud computing system 110. This integration may include software and/or hardware components. In this manner, user device 160 may access POCM system 120 using cloud computing system 110 using the hosted cloud computing platform. In an embodiment, POCM system 120 may be a standalone system separate from cloud computing system 110. In this case, user device 160 may directly interface with POCM system 120.

User device 160 may use POCM system 120 to manage feedback data and/or to generate a product improvement recommendation. User device 160 may be a computer, laptop, tablet, smart phone, or other device configured to display information and/or access a browser on a local area network (LAN) and/or the Internet 170. An employee of a company may use user device 160 to access company information and/or applications managed by cloud computing system 110. For example, cloud computing system 110 may manage company product information. Cloud computing system 110 may store this information in customer database 150. The product information may include product specification sheets, product images, drawings, development notes, parts lists, production schedules, financial information, and/or other information related to company products. The products may be tangible physical items and/or may include software or graphical user interface products.

A company or employee desiring to use POCM system 120 may select one or more products from cloud computing system 110. For example, POCM system 120 may generate a graphical user interface accessible by user device 160. The graphical user interface may include a menu, drop-down menu, list, buttons, icons, text input, and/or other user input interfaces. Using the graphical user interface, a user may select a product. For example, a user may select a product name using a drop-down menu. The drop-down menu may include names of products corresponding to the company and stored in customer database 150. In this manner, user device 160 may access the cloud computing platform of cloud computing system 110 to identify a particular product. In an embodiment, a user may also provide product specifications and/or provide information identifying a new product. The product specification may include product specification sheets, product images, drawings, development notes, parts lists, production schedules, financial information, and/or other information related to company products.

After selecting a particular product, user device 160 may supply a command to POCM system 120 to manage and/or view feedback data. The command may also cause POCM system 120 to generate a product improvement recommendation. To organize the data and/or generate the improvement recommendation, POCM system 120 may use POCM crawler 130 and/or POCM monitor 140.

POCM crawler 130 may screen customer reviews and/or feedback. POCM crawler 130 may identify websites and/or Internet sources to crawl for feedback. A user may specify particular websites to crawl, or POCM crawler 130 may use a default list of websites. For example, POCM crawler may identify websites related to shopping, websites directed toward reviews of products, social media websites, news sites, search engines, and/or other sites that may include feedback comments related to products. The feedback comments may be posted by consumers and/or by reviewers of the products. The comments may include text comments and/or may include video comments. POCM crawler 130 may also support the translation of different feedback comments across multiple languages and/or country barriers. Additionally, POCM crawler 130 may apply a localized sentiment analysis to identify dialect information local to particular geographic areas. The feedback comments may include customer criticism, bug and/or problem reports, reported issues, suggestions on how products may be improved, and/or other data related to the product. By crawling websites, POCM crawler 130 may gather and/or aggregate feedback comments from different Internet 170 sources and/or different geographic areas. Further, in view of the translation functions, POCM crawler may aggregate different feedback comments from disparate languages and/or dialects to produce a global analysis of feedback for products.

POCM crawler 130 may select one or more web pages depending on elements of a supplied product specification. POCM crawler 130 may identify feedback directly related to the product and/or may also identify feedback related to similar products. To identify this information, POCM crawler 130 may use artificial intelligence, machine learning, and/or natural language processing (NLP) techniques. For example, POCM crawler 130 may identify product names, company names, serial codes, and/or any other product identifications within pages or comments on a webpage. POCM crawler 130 may analyze the surrounding textual information, such as, for example, sentences and/or paragraphs, to gather the textual information. In the context of videos, POCM crawler 130 may translate the audio into text so that a transcript of the video may be analyzed. The images of the video may also be identified and analyzed in a similar manner using, for example, optical character recognition techniques. POCM crawler 130 may identify this feedback data for a particular product indicated by user device 160.

Similarly, POCM crawler 130 may identify feedback data for products similar to an identified product. For example, POCM crawler 130 may identify feedback data for competing products and/or products the same family as a selected product. A user may identify a similar product and/or POCM crawler 130 may automatically identify similar products. POCM crawler 130 may identify a similar product using machine learning and/or pattern recognition based on crawled sources. For example, POCM crawler 130 may identify articles and/or feedback comments comparing the selected product with another product. POCM crawler 130 may then identify the other product as a product of interest and may additionally crawl websites for information about the related product. POCM crawler 130 may also identify similar products based on a comparison of features from a product specification provided to POCM crawler 130. For example, POCM crawler 130 may identify components of an identified product based on the specification provided by a user. In an example embodiment, the product may be a bicycle with components such as wheels, a handle bar, pedals, a frame, a seat, gears, chains, and/or other components. POCM crawler 130 may identify other products that also include similar components. POCM crawler 130 may use a threshold number of overlapping components to identify a product as being similar. For example, to be deemed as a similar product and useful for gathering feedback, the similar product may have a number of overlapping components that exceed a threshold.

POCM crawler 130 may crawl the information based on the selected product and/or similar products. In an embodiment, POCM crawler 130 may periodically gather information from the websites or Internet 170 sources depending on one or more previously selected products. In this manner, POCM crawler 130 may continuously gather feedback data relevant to selected products and/or similar products In addition to gathering feedback from Internet 170 sources, POCM crawler 130 may also gather data related to direct customer feedback received by a company. For example, cloud computing system 110 may store customer feedback, suggestions, customer support requests and/or issues, and/or help ticket information in customer database 150. This information may include customer criticism, reported bugs, problems, and/or other issues experienced by customers using the selected product. Customer database 150 may include information related to how support tickets were resolved and/or may include suggestions for optimizing a product to reduce user difficulties.

In an embodiment, POCM crawler 130 may predict customer support traffic and/or support costs for products that are not optimized or that include many issues. POCM crawler 130 may use predictive analysis using machine learning techniques to identify a break-even point between optimization and cost. For example, the break-even point may be an measure of when optimizing an existing product becomes a cost-saving factor. The identification of a measurement of customer support traffic may indicate the magnitude of difficulty in using a product or poor functionality. For example, when a new product is released, POCM crawler 130 may identify the number of returned products and/or comments to identify issues. POCM crawler 130 may quantify this measurement as to begin an optimization process that may be handled by POCM monitor 140.

POCM monitor 140 may be an analytical tool that may generate a graphical user interface view of gathered feedback data and/or generate a product improvement recommendation. POCM monitor 140 may analyze the results from POCM crawler 130. POCM monitor 140 may identify the product features as well as feedback categories corresponding to the product features for the feedback comments retrieved by POCM crawler 130. To identify this information, POCM monitor 140 may apply machine learning, textual analysis, and/or natural language processing techniques on the feedback comments. In this manner, POCM monitor 140 may identify feedback categories corresponding to features of a product. Feedback categories may include positive feedback, negative feedback, and/or neutral feedback. POCM monitor 140 may identify elements of a product and/or a category corresponding to the element.

To illustrate an example embodiment, a selected product may be a bicycle. A feedback statement gathered by POCM crawler 130 may indicate that the "Braking mechanism is too loose." POCM monitor 140 may identify the product element as being the "braking mechanism." POCM monitor 140 may then categorize the feedback comment as a negative comment due to the "too loose" portion of the comment. POCM monitor 140 may perform this analysis using machine learning and/or via the use of training data sets to train a natural language processing engine. POCM monitor 140 may then store an association between the braking mechanism as a product feature and a negative feedback category. POCM monitor 140 may then aggregate this information with other feedback comments that may have been received from the same source and/or from a different source.

POCM monitor 140 may then generate statistics related to the organized feedback data. These statistics may be provided to a user via graphical user interface and/or a conversational user interface (CUI). To organize this feedback information, POCM monitor 140 may provide a summary such as a report. The summary may include a degree of positive, negative, and/or neutral feedback comments and/or percentage values representing a ratio of positive to negative feedback. The ratio may also include ratios of positive to negative to neutral feedback. The summary may also include comments frequently provided.

POCM monitor 140 may also operate in a global mode and/or a localized and personalized mode. The global mode may allow a user to view product data displayed on a global scale across different languages and countries. Global mode, for example, may capture criticism about a product that malfunctions after a year. This criticism may be identified throughout the world. Similarly, products used around the world such as smart phones may yield feedback comments in different languages. POCM monitor 140 may compile this information and/or translate the feedback to a standard language.

In localized and personalized mode, POCM monitor 140 may organize the information to a specific country or region. POCM monitor 140 may also organize the information for specific interest groups, ethnic groups, and/or religious groups. This categorization may also be compiled to indicate a percentage of customers covered by a specified group. For example, POCM monitor 140 may identify criticism about meat but then may identify the source of the comment as a vegetarian based on the contextual information in the feedback comment. POCM monitor 140 may also supply contextual information in a scenario where weather conditions may be important. For example, in a cold climate region, the functionality of a heating system may be important while in a warm climate, climate control or air conditioning may be more important. Similarly, different laws or regulations may be significant in product improvements. For example, in countries where cars are permitted travel faster, brakes may be required to have a higher quality level relative to countries where speed limits are lower. Based on these constraints or conditions, POCM monitor 140 may supply contextual information when generating a summary. For example, POCM monitor 140 may tag the contextual information to appear beside a comment and/or may provide overall statistics related to the gathered feedback.

In addition to providing a summary of the received feedback, POCM monitor 140 may also generate a product improvement recommendation. The product improvement recommendation may be a new product recommendation and/or may suggest an improvement to a particular element of the selected product. To generate a recommendation, POCM monitor 140 may apply an automatic optimization process and/or a configurable optimization process.

The automatic optimization process may use a constraint solving engine and/or machine learning techniques. In this manner, POCM monitor 140 may build a logical model based on the information gathered. The configurable optimization process may be similar to the automatic optimization process but may allow for more user customization with parameters. These processes and optimization engine will be further described with reference to FIG. 2.

The product improvement recommendation generated by POCM monitor 140 may indicate a product feature that may be negatively reviewed and/or where similar products include favorable reviews. In this manner, POCM monitor 140 may provide an improvement recommendation when a product feature receives a number of negative reviews or when a feature of a similar product receives a number of favorable reviews. Based on the correlation to the particular feature of the product, POCM monitor 140 may identify features that may be improved. A product feature may be a component of a product. If a particular component of a product receives negative reviews, POCM monitor 140 may identify the particular component and suggest a replacement. The replacement may be based on positive reviews identified from other similar products and/or from suggestions provided by comments. POCM monitor 140 may identify these parts based on the specification of the products provided by a user and/or based on natural language processing performed on the comments.

For example, a first product may be a bicycle produced by a company. POCM monitor 140 may identify feedback comments indicating that the braking mechanism is too loose. POCM monitor 140 may then identify this comment as a negative comment associated with the braking mechanism. POCM monitor 140 may also identify feedback for a different bicycle that may be produced by a different company or by the same company. POCM monitor 140 may identify feedback comments indicating that the braking mechanism for the other bicycle runs smoothly. With this information, POCM monitor 140 may provide a recommendation to replace the braking mechanism of the first bicycle with one that is similar to the one from the second bicycle. In an embodiment, POCM monitor 140 may aggregate may feedback comments and/or use filter thresholds to identify appropriate recommendations. For example, POCM monitor 140 may provide a recommendation when a number of negative feedback comments has been identified and/or when a number of positive feedback comments has been identified. These threshold may apply to a product as a whole and/or may apply to individual components of a product. In an embodiment, POCM monitor 140 may provide recommendations in response to receiving a command from user device 160 independent of the number of positive or negative feedback comments.

When providing an improvement, POCM monitor 140 may generate text and/or highlight text or images from the specification data of a product. POCM monitor 140 may display this highlight specification data on a graphical user interface. Similarly, POCM monitor 140 may supply accompanying text and/or specification data retrieved from an Internet 170 source for the improvement. In this manner, the company may create a new product and/or may optimize an existing product.

Similar to generating an improvement recommendation, POCM monitor 140 may also allow companies to quickly react to customer feedback. For example, based on the summary provided, a company may choose to respond to a feedback provider via cloud computing system 110. This integrated response system may allow for faster notification as well as faster response. The response may be a message sent and/or posted to the Internet 170 source providing the feedback and/or may be a response to a customer support ticket.

In addition to highlighting positive and/or negative feedback, POCM monitor 140 may also identify unused produce features. For example, if a company releases a new feature in a product, POCM monitor 140 may be used to measure an amount of volume of comments related to the new feature. In this manner, by crawling forums, social media, user groups, and/or customer support channels, POCM system 120 may identify features that are frequently used and/or unused.

Similarly, POCM system 120 may propose correctional activities. For example, if the product is a software application, the POCM system may identify code corrections and/or quality assurance activities. POCM monitor 140 may identify portions of software code and/or algorithms based on the feedback received. Using machine learning techniques, POCM monitor 140 may highlight portions of codes indicating a defect. POCM monitor 140 may use provided coding information supplied by a company and/or managed in cloud computing system 110.

Figure 2:
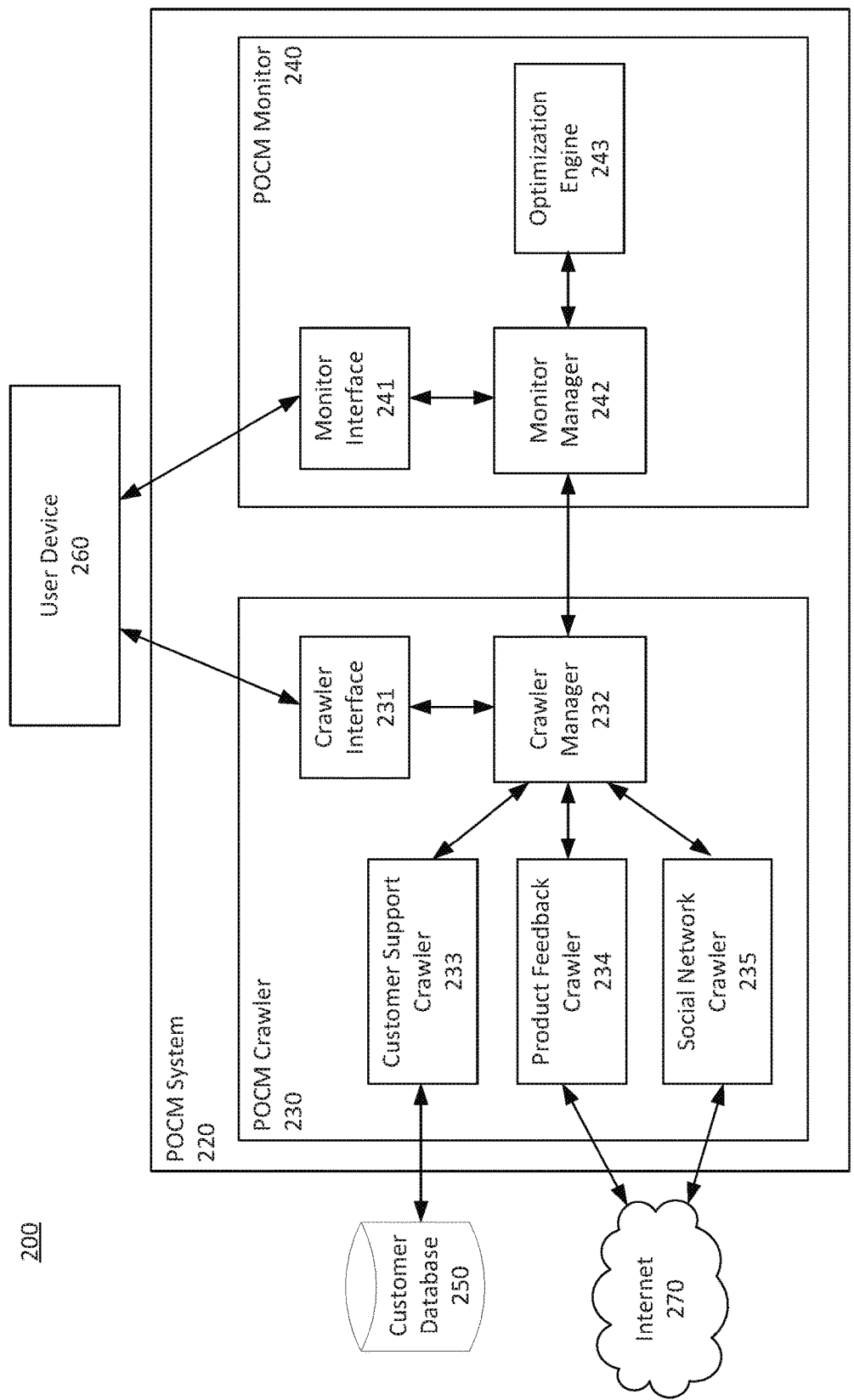
FIG. 2 depicts a block diagram of a product optimization environment, according to some embodiments.

FIG. 2 depicts a block diagram of a product optimization environment 200, according to some embodiments. Product optimization environment 200 may include POCM system 220 and user device 260. Product optimization environment 200 displays an embodiment of communication between user device 260 and with POCM crawler 230 and POCM monitor 240. Similarly, product optimization environment 200 depicts the interaction between POCM crawler 230, customer database 250, and Internet 270.

POCM system 220 is similar to POCM system 120 as described with reference to FIG. 1. POCM system 220 may include one or more processors, memory, databases, in-memory databases, servers, routers, modems, and/or antennae configured to gather feedback data and/or generate a product improvement recommendation. POCM system 220 may include POCM crawler 230 and POCM monitor 240. POCM crawler 230 may operate in a manner similar to POCM crawler 130. POCM monitor 240 may operate in a manner similar to POCM monitor 140.

POCM crawler 230 may interface with customer database 250 and/or Internet 270 to gather feedback data. POCM crawler 230 may use multiple crawlers to perform this operation. For example, POCM crawler 230 may use customer support crawler 233 to crawl customer database 250. Customer support crawler 233 may be configured to efficiently analyze the data from customer service sources. For example, customer support crawler 233 may be configured to analyze support tickets. In this manner, customer support crawler 233 may more efficiently recognize text based on an analysis of a common customer support template. For example, the customer support template may be a data file that includes ratings and/or areas for comment.

Similarly, product feedback crawler 234 and/or social network crawler 235 may be optimized and/or set to identify respective website categories. For example, product feedback crawler 234 may identify websites for shopping or retail. Product feedback crawler 234 may identify particular web pages for identified products. For example, a retailer may use a particular URL for a product. Product feedback crawler 234 may identify these URLs and may monitor feedback corresponding to the products.

In contrast, social network crawler 235 may monitor consumer comments on social media platforms. For example, if a user posts a status update or an image, social network crawler 235 may identify these posts. Social network crawler 235 may, for example, monitor posts mentioning the identified product and/or similar products. In an embodiment, social network crawler 235 may receive notifications when a product has been mentioned.

Crawler manager 232 may manage the operation of customer support crawler 233, product feedback crawler 234, and/or social network crawler 235. Crawler manager 232 may schedule timing for when feedback data is to be crawled. For example, crawler manager 232 may establish a periodic interval for crawling data. Crawler manager 232 may also identify the particular products to crawl. The products may be products specified by user device 260 and/or similar products identified by crawler manager 232. Crawler manager 232 may also identify particular sources and/or determine sources to exclude when crawling for product feedback data. With these parameters, crawler manager 232 may manage the crawling process.

User device 260 may view and/or manage these parameters via crawler interface 231. Crawler interface 231 may provide a graphical user interface display accessible by user device 260. Using the graphical user interface, user device 260 may command POCM crawler 230 to automatically determine sources and/or times for crawling. Similarly, user device 260 may supply commands to select particular sources and/or timing for crawling. The graphical user interface may also allow user device 260 to supply product specification information to POCM crawler 230. With the product specification information, crawler manager 232 may identify particular product features to identify similar products. Crawler manager 232 may also identify particular keywords to use for crawling.

After crawling feedback sources and/or gathering the feedback comments, crawler manager 232 may transmit these comments to monitor manager 242. This transmission may occur at particular time intervals, may be continuous, and/or may occur in response to a command provided by user device 260. For example, user device 260 may request a product improvement recommendation to prompt POCM monitor 240 to retrieve updated data from POCM crawler 230.

POCM monitor 240 may use monitor manager 242 to generate a summary of the feedback gathered by POCM crawler 230 and/or to generate a product improvement recommendation. To generate a summary, monitor manager 242 may use artificial intelligence and/or one or more templates to compile the information received from crawler manager 232. Monitor manager 242 may compile reports, summaries, graphics, and/or other visual aids for presenting the feedback data. Similarly, monitor manager 242 may also generate an audio playback of the feedback data. The summaries and/or graphics may include ratio information related to positive, negative, and/or neutral feedback. This information may also include a measurement of the volume of feedback retrieved. The summaries and/or graphics may also be organized based on product feature. For example, a first feature may correspond to a first graph while a second feature may correspond to a second graph. The graphs may be charts, such as, for example, a pie chart or bar chart. In this manner, the feedback may be organized based on product feature.

Similarly, using product specification data stored in either memory of POCM system 220 or customer database 250, monitor manager 242 may construct a graphical user interface correlating the feedback to images of the product and product features. For example, the graphical user interface may highlight components of a product corresponding to the feedback retrieved. In an example embodiment, components having a higher ratio of negative feedback may be highlighted in red while components having a higher ratio of positive feedback may be highlighted in green. Monitor manager 242 may also import graphics from similar products and indicate improvements to be made to a selected product.

To generate an improvement recommendation, monitor manager 242 may use optimization engine 243. Optimization engine 243 may perform an automatic optimization process, a configurable optimization process, and/or a constraint solving process. The constraint solving process may include building a model based on feedback receive as well as the product features identified based on information provided to monitor manager 242. Using this information, optimization engine 243 may build a logical model to correlate the feedback identified with particular components of a product. The constraint solving process may identify part dependency among the components of the product. For example, the constraint solving process may identify components that may be deemed irreplaceable based on the functionality of the product. In this manner, the constrain solving process may identify components that are modular and other components that may not be modular. Further, the constraint solving process may apply a multidimensional approach to correlate the feedback from different sources (e.g., an Internet source and customer support channel). Optimization engine 243 may then use the constraint solving process as a predictive logic process to generate an improvement recommendation.

The improvement recommendation may include text, images, and/or audio describing a replacement to a product component. For example, if monitor manager 242 identifies a component that is correlated to positive feedback from a similar or competing product, monitor manager 242 may generate an indication that the component may be beneficial to include in a selected product. Monitor manager 242 may suggest that a negatively reviewed component be replaced with a positively reviewed component.

The improvement recommendation and/or the summary of the feedback comments may be displayed in a graphical user interface generated by monitor interface 241. Monitor interface 241 may generate a graphical user interface that may be displayed on user device 260. User device 260 may then interact with the graphical user interface to view the product recommendation and/or the summary. User device 260 may manipulate images and/or highlighting to view the information generated by monitor manager 242. This information may be in the form of highlighting of product specification files provided to POCM system 220.

Figure 3:
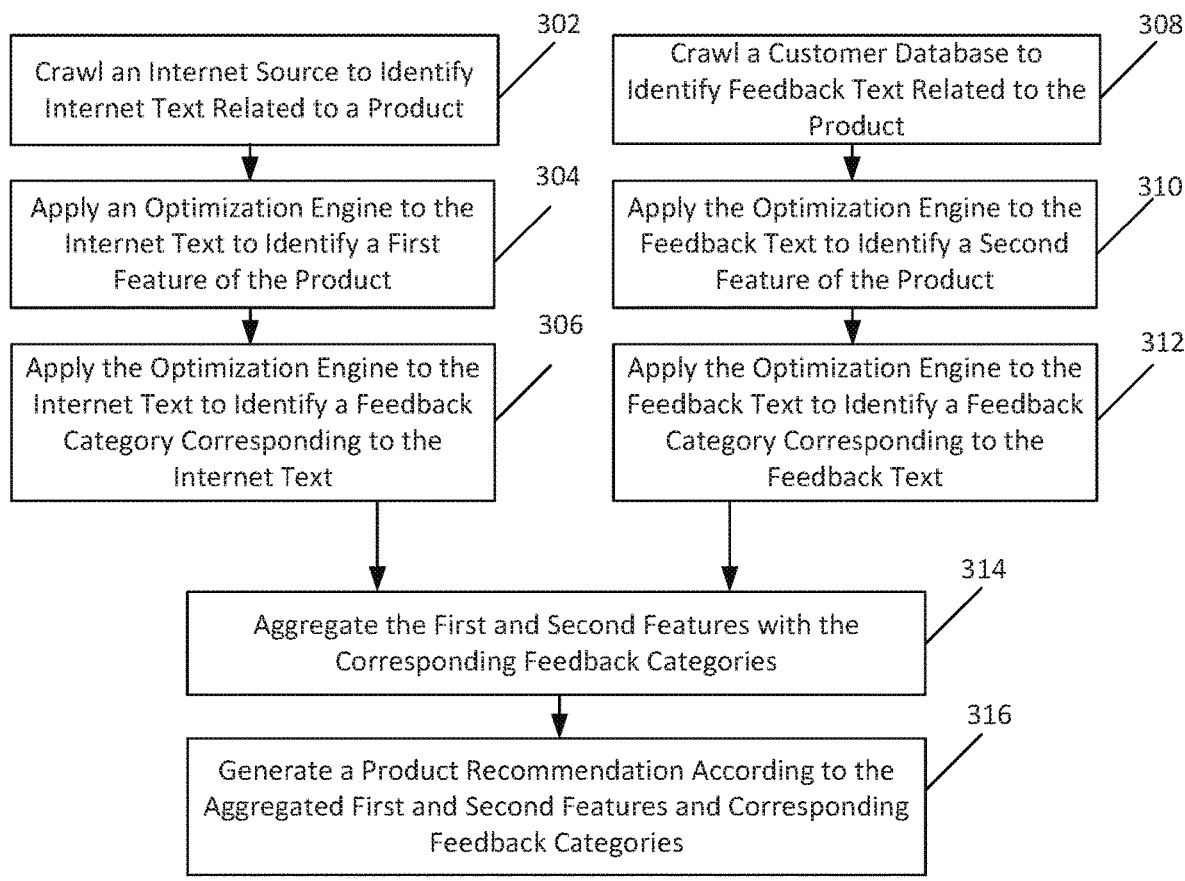
FIG. 3 depicts a flowchart illustrating a method for generating a product improvement recommendation using different feedback sources, according to some embodiments.

FIG. 3 depicts a flowchart illustrating a method 300 for generating a product improvement recommendation using different feedback sources, according to some embodiments. Method 300 shall be described with reference to FIG. 2; however, method 300 is not limited to that example embodiment.

In an embodiment, POCM system 220 may utilize method 300 to generate a product improvement recommendation using different source of feedback information. While method 300 is described with reference to POCM system 220, method 300 may be executed on any computing device, such as, for example, the computer system described with reference to FIG. 6 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

At 302, POCM system 220 may crawl an Internet 270 source to identify Internet text related to a product. Crawler manager 232 may identify particular Internet 270 sources. The Internet 270 sources may be specified by a user device 260 and/or automatically selected by crawler manager 232. Crawling an Internet 270 source may include retrieving web page data and/or comments provided on the web page. This feedback data may be textual information and/or video information. The crawling may also occur at periodic intervals set by crawler manager 232. Crawler manager 232 may use key words identified from a product identification or specification to identify sources of information. For example, the product identification may be a product name, serial number, or identification number. The specification may include details such as part names, part numbers, and/or other details related to the product.

At 308, POCM system 220 may crawl a customer database 250 to identify feedback text related to the product. Customer database 250 may be, for example, a feedback data managed by a company. The feedback text may include customer service feedback text. Customer database 250 may include customer support information, such as, for example, customer feedback and/or help ticket information. For example, the help ticket information may include notes or comments indicating how a help ticket was resolved. POCM system 220 may crawl customer database 250 using the same engine as crawling an Internet 270 source and/or may use a different engine. The crawling may be performed serially or in parallel. Crawler manager 232 may generate a schedule for crawling that includes crawling an Internet 270 source and customer database 250.

At 304, POCM system 220 may apply an optimization engine 243 to the internet text to identify a first feature of the product. At 310, POCM system 220 may apply optimization engine 243 to the feedback text to identify a second feature of the product. POCM system 220 may apply optimization engine 243 at POCM monitor 240. Crawler manager 222 may transmit the internet text and/or feedback text to monitor manager 242 after processing or after aggregating the information together. Monitor manager 242 may apply optimization engine 243 to the text to determine product feature information in the text. In an embodiment, crawler manager 222 may perform this identification during the crawling process to identify text corresponding to the product and components of the product. At 304 and 310, POCM system 220 may identify product components within text that has been gathered.

At 306, POCM system 220 may apply optimization engine 243 to the internet text to identify a feedback category corresponding to the internet text. At 312, POCM system 220 may apply optimization engine 243 to the feedback text to identify a feedback category corresponding to the feedback text. The feedback categories may indicate whether a feedback comment includes positive, negative, and/or neutral feedback. Further, POCM system 220 may correlate this feedback to particular components of a product. In this manner, POCM system 220 may identify product components that receive negative feedback or positive feedback. POCM system 220 may use this information to generate a product improvement recommendation and/or generate statistics related to a product and/or components of the product.

At 314, POCM system 220 may aggregate the first and second features with the corresponding feedback categories. This aggregation may include compiling the components with an association to the collected feedback. In this manner, POCM system 220 may identify particular components that receive positive feedback and/or negative feedback. POCM system 220 may correlate this feedback across multiple sources. In an embodiment, POCM system 220 may translate different languages so that the feedback may be correlated in a standard language. The aggregation may allow POCM system 220 to generate a summary of the feedback comments and/or may allow the creation of a graphical user interface displaying feedback comments from different sources. Further, POCM system 220 may generate a graphical user interface highlighting components of the product that correspond to the comments. POCM system 220 may highlight the first feature and a second feature based on the aggregation.

At 316, POCM system 220 may generate a product recommendation according to the aggregated first and second features and corresponding feedback categories. POCM system 220 may use optimization engine 243 to generate the product recommendation. The recommendation may be a new product and/or may include an improvement to a selected product. A new product may include the first feature and the second feature if POCM system 220 identifies the first feature and the second feature as corresponding to positive feedback. If POCM system 220 identifies the first feature or the second feature as corresponding to negative feedback, POCM system 220 may generate an improvement recommendation to remove and/or replace the first feature or the second feature. This improvement may include identifying a similar component from a similar product that has received positive feedback. In this manner, the improvement may include a suggestion to replace a product feature with a similar feature from another product. The recommendation may include replacing one or more components of a selected product.

Figure 4:
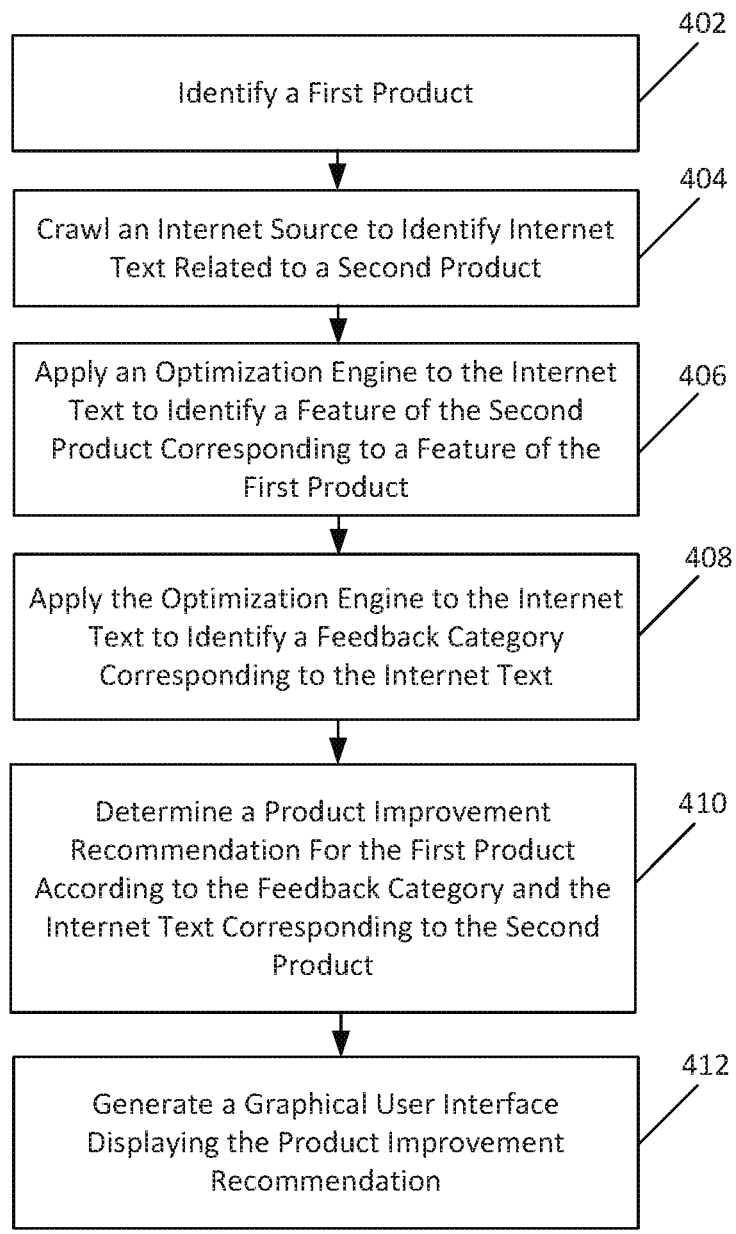
FIG. 4 depicts a flowchart illustrating a method for generating a product improvement based on a feature similarity, according to some embodiments.

FIG. 4 depicts a flowchart illustrating a method 400 for generating a product improvement based on a feature similarity, according to some embodiments. Method 400 shall be described with reference to FIG. 2; however, method 400 is not limited to that example embodiment.

In an embodiment, POCM system 220 may utilize method 400 to generate a product improvement recommendation based on a component similarity from a similar product. While method 400 is described with reference to POCM system 220, method 400 may be executed on any computing device, such as, for example, the computer system described with reference to FIG. 6 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

At 402, POCM system 220 may identify a first product. User device 260 may, for example, supply product identification information to POCM system 220 so that POM system 220 may identify the first product. For example, the product identification may include a product name, serial number, or identification number. The product identification may also include a product specification that may include part names, part numbers, and/or other details related to the product. POCM system 220 may analyze this information to generate key words to crawl an Internet 270 source.

At 404, POCM system 220 may crawl an Internet 270 source to identify internet text related to a second product. Using the information provided by user device 260, POCM system 220 may identify a second product similar to the first product. This similarity may be based on a number of similar product components. For example, POCM system 220 may crawl an Internet 270 source with one or more searches include different components of the first product. POCM system 220 may identify a second product as being similar if the number of shared components exceeds a threshold.

POCM system 220 may identify a second product based on content of the Internet 270 source. For example, if the Internet 270 source includes a comparison of the first product to other products, POCM system 220 may identify the second product as a product identified during comparison. The Internet 270 source may be, for example, an article or review. A feedback post on social media may also identify a second product.

Similarly, POCM system 220 may also identify a second product using a suggestion provided on the Internet 270 source. For example, if the Internet 270 source is an online retailer, the online retailed may suggest a similar product. Based on the suggestion and crawling of the website data, POCM system 220 may identify the second product as a similar product. After the identification of a second product, POCM system 220 may retrieve the surrounding text related to the second product.

At 406, POCM system 220 may apply an optimization engine 243 to the internet text to identify a feature of the second product corresponding to a feature of the first product. For example, POCM system 220 may identify a component of the second product that is similar to a component of the first product.

At 408, POCM system 220 may apply optimization engine 243 to the internet text to identify a feedback category corresponding to the internet text. For example, the feedback category may be a positive, negative, or neutral category. The internet text may describe the feature of the second product in a positive manner. For example, using natural language processing (NLP) techniques, POCM system 220 may categorize the text corresponding to the feature or component. A positively reviewed component may suggest an improvement.

At 410, POCM system 220 may determine a product improvement recommendation for the first product according to the feedback category and the internet text corresponding to the second product. Using optimization engine 243, POCM system 220 may identify the feature of the second product as being capable of replacing a similar feature in the first product. POCM system 220 may also recognize that that the feature is modular based on a machine learning analysis of the product specification. POCM system 220 may perform a constraint model analysis as will be further described with reference to FIG. 5 to determine the product improvement recommendation. POCM system 220 may generate the product recommendation after determining that the feedback category corresponding to the internet text is positive.

In an embodiment, POCM system 220 may aggregate multiple instances of internet text. The aggregation may include text having different feedback categories. Optimization engine 243 may generate a recommendation when a number of positive instances have been identified. In an embodiment, optimization engine 243 may generate a recommendation when a ratio of positive to negative instances exceeds a threshold ratio. In cases where the number of negative feedback instances exceeds positive feedback instances, POCM system 220 may not generate a recommendation. This ratio may indicate that the feature of the second product is poorly reviewed and would not improve the first product.

POCM system 220 may also generate a product recommendation based on a comparison of the feedback information from the second product relative to the first product. For example, if the number of positive feedback instances for the second product is greater than the number of positive feedback instances for the first product, POCM system 220 may generate a product improvement recommendation. This situation may indicate that customers prefer the feature from the second product more than the feature from the first product. Similarly, POCM system 220 may compare ratios of positive to negative feedback. For example, if the ratio of positive to negative feedback for the second product is greater than the ratio of the first product, POCM system 220 may generate a product recommendation to improve the first product with elements from the second product. POCM system 220 may perform this analysis on a component-by-component basis and may generate component improvement recommendations. POCM system 220 may recommend that a component from the first product be replaced with the component from the second product.

At 412, POCM system 220 may generate a graphical user interface displaying the product improvement recommendation. Using the graphical user interface, user device 260 may view the recommendation. The recommendation may include descriptive text and/or highlighting of one or more images of the first product and/or the second product. For example, if a specification has been provided for the first product, the recommendation may generate a visual indicator on the specification components that identifies the component for improvement. This improvement may be a suggestion to replace the component with a similar component from the second product. Similarly, POCM system 220 may identify visually indicate the feature from the second product for use in improving the first product. For example, POCM system 220 may have retrieved text and/or images describing the feature of the second product. POCM system 220 may present this information in a graphical user interface for a user to view.

Figure 5:
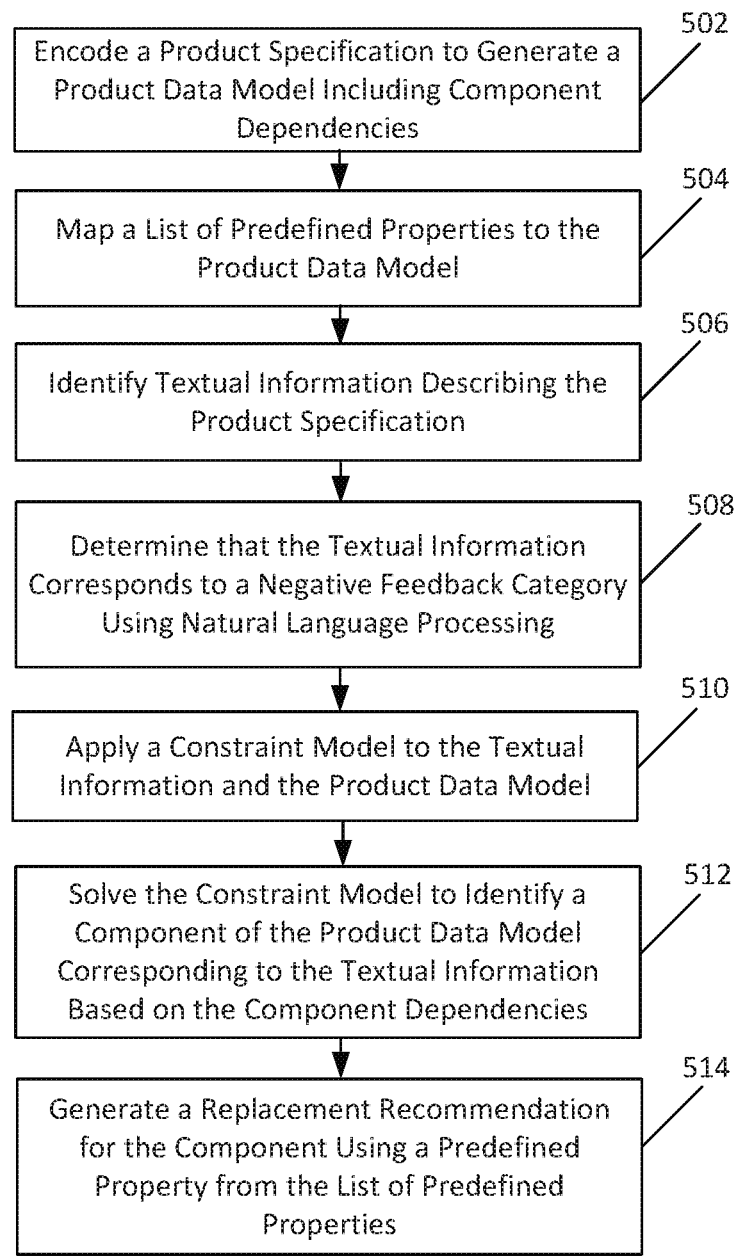
FIG. 5 depicts a flowchart illustrating a method for generating a replacement recommendation based on component dependency, according to some embodiments.

FIG. 5 depicts a flowchart illustrating a method 500 for generating a replacement recommendation based on component dependency, according to some embodiments. Method 500 shall be described with reference to FIG. 2; however, method 500 is not limited to that example embodiment.

In an embodiment, POCM system 220 may utilize method 500 to generate a replacement recommendation based on an analyzed component dependency from a product specification. POCM system 220 may execute method 500 using one or more components such as optimization engine 243. While method 500 is described with reference to POCM system 220, method 500 may be executed on any computing device, such as, for example, the computer system described with reference to FIG. 6 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 5, as will be understood by a person of ordinary skill in the art.

At 502, POCM system 220 may encode a product specification to generate a product data model including component dependencies. This encoding may include receiving product specification data and/or files from user device 260. The product specification may include product specification sheets, product images, drawings, development notes, parts lists, production schedules, financial information, and/or other information related to company products. Upon receipt of data files from user device 260, POCM system 220 may analyze the data to generate a product data model. For example, if the product specification data includes a 3D modeling file, this data may be used to generate the product data model. The product data model may include component dependencies. For example, POCM system 220 may identify components corresponding to the product specification and/or how the components relate to each other. This encoding may generate a logical representation based on a first-order logical mapping.

When analyzing the component dependencies, POCM system 220 may components and/or portions of components. This analysis may yield a hierarchical model of the product and/or a relational mapping between components of the product. For example, if the product is a bicycle, the product data model may identify components such as a frame, handlebar, wheels, and a seat. The component dependencies may describe the interaction of the components. Further, POCM system 220 may divide components into particular portions to develop further analysis. For example, the bicycle seat may include a top portion for sitting as well as an adjustable stem portion connecting the frame to the seat. In this manner, the taxonomy of the product may be mapped. The bicycle may represent the product; the seat may represent a component of the product; and the top portion and adjustable stem may represent portions of the component.

At 504, POCM system 220 may map a list of predefined properties to the product data model. The list of predefined properties may include substitute components corresponding to product components and/or portions of product components. The list may be stored in customer database 250 and/or correspond to an list of inventory for a particular customer. In an embodiment, POCM system 220 may build this list of predefined properties by crawling Internet 270 sources and generating a list of similar components. At 504, POCM system 220 may map the list to the product data model to correlate components with corresponding replacement parts. This mapping may represent a lexicon of components corresponding to the product.

At 506, POCM system 220 may identify textual information describing the product specification. POCM system 220 may crawl Internet 270 sources and/or customer database 250 to identify this textual information. This identification may be performed in a manner similar to the embodiments described with reference to FIGS. 2, 3, and 4.

At 508, POCM system 220 may determine that the textual information corresponds to a negative feedback category using natural language processing. The natural language processing may be a machine learning technique configured to categorize textual information. This analysis may be performed in a manner similar to those described at 306 and 312 in FIGS. 3 and 408 in FIG. 4.

At 510, POCM system 220 may apply a constraint model to the textual information and the product data model. POCM system 220 may apply the constraint model in response to determining that the textual information corresponds to a negative feedback category. The constraint model may be solved to determine a recommendation to replace a component and/or a portion of a component identified in the textual information.

At 512, POCM system 220 may solve the constraint model to identify a component of the product data model corresponding to the textual information based on the component dependencies. In this manner, POCM system 220 may use the component dependencies to identify a component and/or a portion of a component corresponding to the textual information. Because of the constraint model application, POCM system 220 may generate a replacement recommendation even if the product component is not explicitly identified in the textual information.

For example, the textual information identified may state that "sitting on the bicycle is uncomfortable." Using natural language processing, POCM system 220 may identify the textual language as being directed to the seat of the bicycle. POCM system 220 may then apply the taxonomy created using the product data model to identify the portions of the seat based on the component dependencies. In this manner, POCM system 220 may identify portions within a component even if the textual information does not identify the particular portion. POCM system 220 may then solve the constraint model to generate a replacement recommendation for the component or portion of the component.

At 514, POCM system 220 may generate a replacement recommendation for the component using a predefined property from the list of predefined properties. For example, considering the bicycle seat, POCM system 220 may identify that the top portion of the bicycle seat may be replaced based on the solution of the constraint model. POCM system 220 may then identify substitute components from the list of predefined properties. For example, the list may include a gel seat material while the current seat component is plastic. Upon solving the constraint model, POCM system 220 may generate the replacement recommendation indicating that the plastic top portion of the seat should be replaced with a gel material.

Figure 6:
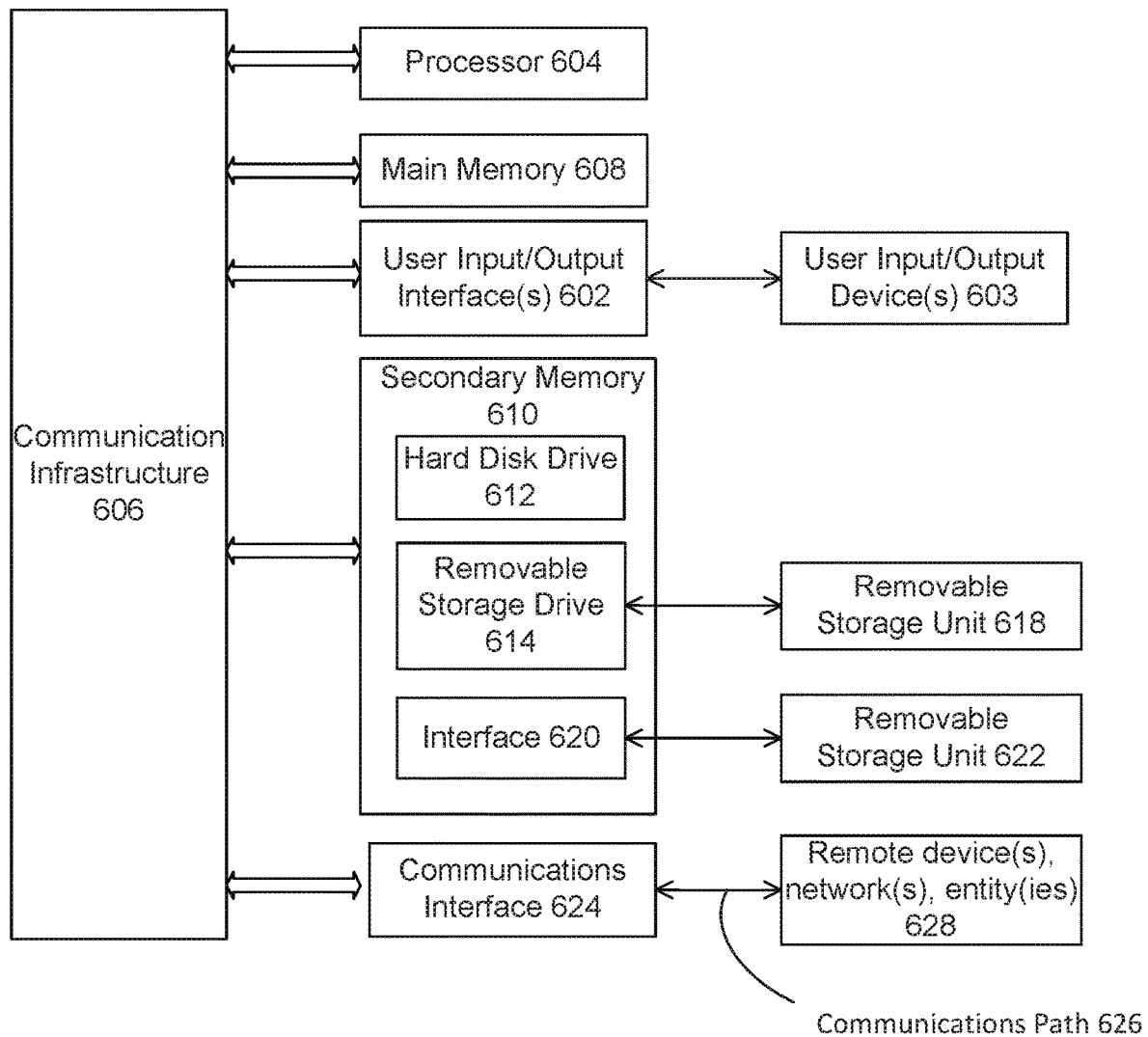
FIG. 6 depicts an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data. Main memory 608 may also include an in-memory database.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
identifying a first product;
crawling an internet source to identify internet text for a second product that is similar to the first product, wherein the crawling comprises determining that the first product and the second product have a number of shared features exceeding a threshold value;
applying an optimization engine to the internet text to identify a feature of the second product corresponding to a feature of the first product;
applying the optimization engine to the internet text to identify a feedback category for the feature of second product;
predicting a support cost for the first product based on feedback received for the feature of the first product;
identifying a break-even point between improving the first product and the predicted support cost for the first product;
determining the feature of the second product is capable of replacing the feature of the first product based on the identified break-even point, the feedback category, and the internet text corresponding to the feature of the second product; and
generating a graphical user interface displaying a product improvement recommendation for the first product based on the determination that the feature of the second product is capable of replacing the feature of the first product.

2. The computer-implemented method of claim 1, wherein the crawling further comprises:
identifying the second product based on the internet text comparing the second product to the first product.

3. The computer-implemented method of claim 1, wherein the product improvement recommendation includes an instruction to replace the feature of the first product with the feature of the second product.

4. The computer-implemented method of claim 1, wherein the generating further comprises:
highlighting, on the graphical user interface, the feature of the first product in a product specification to indicate the product improvement recommendation.

5. The computer-implemented method of claim 1, further comprising:
crawling a customer feedback database to identify customer service feedback text;
applying the optimization engine to the customer service feedback text to identify a negative feedback category corresponding to a second feature of the first product; and
generating a second product improvement recommendation directed to the second feature of the first product.

6. The computer-implemented method of claim 1, wherein the determining further comprises:
applying a constraint model to the internet text and a product data model, wherein the product data model includes component dependencies; and
solving the constraint model to identify a component of the product data model corresponding to the textual information based on the component dependencies.

7. A system, comprising:
a memory; and
at least one processor coupled to the memory and configured to:
identify a first product;
crawl an internet source to identify internet text for a second product that is similar to the first product, wherein to crawl the internet source the at least one processor is further configured to determine that the first product and the second product have a number of shared features exceeding a threshold value;
apply an optimization engine to the internet text to identify a feature of the second product corresponding to a feature of the first product;
apply the optimization engine to the internet text to identify a feedback category for the feature of second product;
predict a support cost for the first product based on feedback received for the feature of the first product;
identify a break-even point between improving the first product and the predicted support cost for the first product;
determine the feature of the second product is capable of replacing the feature of the first product based on the identified break-even point, the feedback category, and the internet text corresponding to the feature of the second product; and
generate a graphical user interface displaying a product improvement recommendation for the first product based on the determination that the feature of the second product is capable of replacing the feature of the first product.

8. The system of claim 7, wherein to crawl the internet source, the at least one processor is further configured to:
identify the second product based on the internet text comparing the second product to the first product.

9. The system of claim 7, wherein the product improvement recommendation includes an instruction to replace the feature of the first product with the feature of the second product.

10. The system of claim 7, wherein to generate the graphical user interface, the at least one processor is further configured to:
highlight, on the graphical user interface, the feature of the first product in a product specification to indicate the product improvement recommendation.

11. The system of claim 7, wherein the at least one processor is further configured to:
crawl a customer feedback database to identify customer service feedback text;
apply the optimization engine to the customer service feedback text to identify a negative feedback category corresponding to a second feature of the first product; and
generate a second product improvement recommendation directed to the second feature of the first product.

12. The system of claim 11, wherein the customer service feedback text includes help ticket data.

13. The system of claim 7, wherein to determine the product improvement recommendation, the at least one processor is further configured to:
apply a constraint model to the internet text and a product data model, wherein the product data model includes component dependencies; and solve the constraint model to identify a component of the product data model corresponding to the textual information based on the component dependencies.

14. A non-transitory computer-readable medium having instructions stored thereon that, when executed by at least one computing device, cause the at least one computing device to perform operations comprising:
   identifying a first product;
   crawling an internet source to identify internet text for a second product that is similar to the first product, wherein the crawling comprises determining that the first product and the second product have a number of shared features exceeding a threshold value;
   applying an optimization engine to the internet text to identify a feature of the second product corresponding to a feature of the first product;
   applying the optimization engine to the internet text to identify a feedback category for the feature of second product;
   predicting a support cost for the first product based on feedback received for the feature of the first product;
   identifying a break-even point between improving the first product and the predicted support cost for the first product;
   determining the feature of the second product is capable of replacing the feature of the first product based on the identified break-even point, the feedback category, and the internet text corresponding to the feature of the second product; and
   generating a graphical user interface displaying a product improvement recommendation for the first product based on the determination that the feature of the second product is capable of replacing the feature of the first product.

15. The non-transitory computer-readable medium of claim 14, wherein to crawl the internet source, the operations further comprise:
   identifying the second product based on the internet text comparing the second product to the first product.

16. The non-transitory computer-readable medium of claim 14, wherein the product improvement recommendation includes an instruction to replace the feature of the first product with the feature of the second product.

17. The non-transitory computer-readable medium of claim 14, wherein to generate the graphical user interface, the operations further comprise:
   highlighting, on the graphical user interface, the feature of the first product in a product specification to indicate the product improvement recommendation.

18. The non-transitory computer-readable medium of claim 14, the operations further comprising:
   crawling a customer feedback database to identify customer service feedback text including help ticket data;
   applying the optimization engine to the customer service feedback text to identify a negative feedback category corresponding to a second feature of the first product; and
   generating a second product improvement recommendation directed to the second feature of the first product.

19. The non-transitory computer-readable medium of claim 14, wherein to determine the product improvement recommendation, the operations further comprise:
   applying a constraint model to the internet text and a product data model, wherein the product data model includes component dependencies; and
   solving the constraint model to identify a component of the product data model corresponding to the textual information based on the component dependencies.

20. The computer-implemented method of claim 1, wherein the predicting further comprises:
   predicting the support cost for the first product based on the feedback received for the first product using a machine learning technique, wherein the feedback received for the first product comprises a number of returned units of the first product and an amount of customer support traffic received for the first product.

21. The computer-implemented method of claim 1, wherein the crawling further comprises:
   identifying the second product using a suggestion provided by the internet source.

* * * * *